United States Patent [19]

Chubb

[11] Patent Number: 5,585,800
[45] Date of Patent: Dec. 17, 1996

[54] LOCATION-CORRECTOR FOR REMOVING SUN-INDUCED EFFECTS IN THE GLOBAL POSITIONING SYSTEM

[76] Inventor: Scott R. Chubb, 9822 Pebble Weigh Ct., Burke, Va. 22015

[21] Appl. No.: 464,005

[22] Filed: Jun. 2, 1995

[51] Int. Cl.⁶ ........................................ G01S 5/02
[52] U.S. Cl. ........................................ 342/357
[58] Field of Search .................... 342/357, 352, 342/457; 364/449

[56] References Cited

U.S. PATENT DOCUMENTS

| 5,148,179 | 9/1992 | Allison | 342/357 |
| 5,359,521 | 10/1994 | Kyrtsos et al. | 364/449 |
| 5,379,224 | 1/1995 | Brown et al. | 364/449 |

OTHER PUBLICATIONS

Chubb, "Sun–Induced Variations In Time In The Global Positioning System", Astrophysics and Space Tech., vol. 213, pp. 63–73.
Kee et al., "Wide Area Differential GPS", variation, pp. 123–143, 1991.
Weiss, "Apparatus Diurnal Effects In The Global Positioning System", IEEE Trans. Instr. and Meas., vol. 38, No. 5, pp. 991–993, 1989.
Milliken et al., "Principle Of Operation Of Navstar And System Characteristics", Navigation, vol. 25, No. 2, pp. 95–106, 1978.
Spiker, "GPS Signal Structure And Performance Characteristics", Navigation, vol. 25, No. 2, pp. 121–146.

VanDiereddoner et al., "The GPS Navigation Message", Navigation, vol. 28, No. 2, pp. 147–165, 1978.
Martin, "GPS User Equipment Error Models", Navigation, vol. 25, No. 2, pp. 201–210, 1978.
Copps "An Aspect Of The Roe Of The Clock In A GPS Receiver", Navigation, vol. 31, No. 3, pp. 233–242, 1984.
Smith et al., "Sensitivity GPS Acquisition To Initial Data Uncertainties", Navigation, vol. 31, No. 3, pp. 220–232, 1984.
Knable et al., "Clock Coasting And Acetimeter Error Analysis For GPS", Navigation, vol. 31, No. 4, pp. 289–302, 1984.
Robbins, "Reference Trajectories From GPS Measurements", Navigation, vol. 35, No. 1, pp. 89–103, 1988.
Blair, "Time And Frequency: Theory And Fundamentals", Nat. Bur. Of STDS, Ch. 8, pp. 151–209, 1974.
Russel et al., "Control Segment And User Performance", Navigation, vol. 25, No. 2, pp. 166–172, 1978.

Primary Examiner—Thomas H. Tarcza
Assistant Examiner—Dao L. Phan

[57] ABSTRACT

The system for location-correction for removing the sun-induced effects in the global positioning system (GPS) caused by the problem of transforming the frequency of coherent radio signals to the geocentric inertial coordinate frame involves an implicit, dependence on earth-sun-clock orientation. This is accomplished by determining the systematic errors associated with sun-induced effects that alter the frequency of the transmission of every satellite within the GPS because of the GPS satellites orbit around both the sun and the earth and applying a correction factor to the initially determined position to obtain the true position within 10 cm to one meter.

17 Claims, 3 Drawing Sheets

LOCATION-CORRECTOR FOR REMOVING SUN-INDUCED EFFECTS IN THE GLOBAL POSITIONING SYSTEM

BACKGROUND OF THE INVENTION

1. Field of the Invention

This invention involves the correction of position information obtained from the global positioning system (GPS), and more specifically to the correction of GPS position information for errors induced by the GPS satellites orbit about the earth and the sun.

2. Description of the Related Art

The complete global positioning system (GPS) constellation involves twenty-four satellites separated by large distances, each possessing a highly accurate clock and a microwave source with precise frequency. The problem of transforming the frequency of coherent radio signals to the geocentric inertial coordinate frame (as required during the transfer of time information) involves an implicit, dependence on earth-sun-clock orientation that has been omitted, except in very-long-baseline interferometry (VLBI). To obtain the required time standard between satellites in the GPS system, each satellite in the system has an atomic (Cs or Rb) clock possessing a frequency that is accurate to one part in $\sim 10^{13}$–$10^{14}$. See, Copps, *An Aspect of the Role of the Clock in a GPS Receiver*, Navigation, Vol. 31, No. 3, pp. 233–242, 1984; Knable et al., *Clock Coasting and Altimeter Error Analysis for GPS*, Navigation, Vol. 31, No. 4, pp.289–302, 1984, which are hereby incorporated in their entirety by reference for all purposes. The orbit of each satellite is approximately circular (possessing an eccentricity of $\sim 10^{-3}$), has a 12 hour period and is located in one of three orbital planes. Each orbital plane intersects the plane of the equator at an angle of 55O. The signal from each GPS satellite includes a frequency offset $\Lambda$ ($\sim 1$ part on $10^{10}$). This offset automatically accounts for important earth-induced gravitational blue-shift and second order Doppler effects (SDE's), which insure that GPS clocks are synchronized, based on the same procedure used in defining universal time (UT), and that GPS transmissions effectively are altered in a manner that would make them appear to originate from a frame that is stationary in the frame of the moving geoid defined by the surface of the ocean at the surface of the earth. As a consequence, time is being maintained and defined in effectively the same manner both in GPS satellites and through UT (as defined at the surface of the ocean).

The GPS is used to determine position by correlating information from coherent microwave transmissions provided by the constellation of satellites. See; Milliken et al., *Principle of Operation of NAVSTAR and System Characteristics*, Navigation, Vol. 25, No, 2, pp. 95–106, 1978 and Spilker, *GPS Signal Structure and Performance Characteristics*, Navigation, Vol. 25, No, 2, pp. 121–146, 1978, which are hereby incorporated in their entirety by reference for all purposes. The accuracy of this procedure is determined by non-systematic and systematic errors. Systematic errors are associated with known, appreciable effects that result from the inaccuracies of the frequency and of the length of the path of each signal from the satellite to a potential user. Non-systematic errors are inaccuracies in the determination of path length and frequency that can not be eliminated because they are the result of the known limitations of the existing procedures for determining these quantities. Optimal performance requires that non-systematic errors be minimized and systematic errors be eliminated.

An anomalous absolute error of 1–10 feet in user position relative to each GPS satellite exists as a consequence of an error in the determination of path length and/or frequency, and this absolute error varies periodically in the transmission from each GPS satellite as a function of time in a regular fashion: maximal and minimal errors from this effect occur approximately once every 12 hours. This anomalous error has been previously thought to be the result of an unknown ionospheric effect that has not been systematically removed by existing procedures. M. Weiss reported in Weiss, *Apparent Diurnal Effects in the Global Positioning System*, IEEE Trans. Instr. and Meas., Vol. 38, NO. 5, pp. 991–997, Oct. 1989, which is hereby incorporated in its entirety by reference for all purposes, a large, systematic variation in the Allan variance (See; Blair, *Time and Frequency: Theory and Fundamentals*, Nat. Bur. of Stds., Vol. 140, pp. 151–205, 1974, which is hereby incorporated by reference in its entirety for all purposes) between GPS time and UT (corresponding to a systematic variation of the normalized variance of the difference between measured clock frequencies provided by GPS and UT). These variations 1) occur in the transmissions provided by all satellites, 2) have their maximal peak-to-peak variation diurnally, and have maximal magnitude (when averaged over one-half day) corresponding to a deviation between GPS time and UT of 1–10 nanoseconds.

It has been assumed that orbital motion of the earth around the sun does not alter the frequency of the signal from a GPS satellite between the points of transmission and reception. As a consequence, no attempt has been made to incorporate known sun-induced variations in the frequencies of radio transmissions that have been identified from VLBI, as stated above. Because this effect is neglected in all GPS signals, the frequencies from all GPS transmissions as they are received will be different from the value that they are supposed to have by an amount that may be accounted for by a systematic correction that applies only during the time interval $\Delta t$ required for the signal to reach the earth. A comparable trend in the Allan variance involving a regular, periodic variation, with period of one day (and maximal peak-to-peak variation occurring diurnally) can be inferred from the product of the maximum values of the time interval $\Delta t_{max}$ ($\sim 0.1$ s) required for the signal to reach the earth and the fractional deviation in frequency $\Delta f/f_o|_{max}$ that results from the sun-induced effects outlined herein. This means the effect is not accumulative as it would be if it affected the accuracy of time-keeping and can be derived from the product of $\Delta t$ with the deviation in frequency from the correct value. The resulting correction is periodic (with a period of one day) and has a maximal fractional magnitude of $\sim 10^{-8}$. Because the value of $\Delta t$ is roughly 0.1 seconds, the resulting correction, on the average, for the difference between time "reported" by the GPS at the earth surface and UT is 1–10 nanoseconds during a twelve hour period. These deviations between UT and GPS time should be systematic, meaning that they should be seen in the reported time that is sent by all satellites.

The anomalous 1–10 foot error in the GPS has been determined not to be the result of ionospheric effect but occurs because of variations in the frequency of each of the two GPS L-band transmissions (for developing the C/A and P-codes) that are the result of known special and general relativistic effects (previously identified in very-long baseline interferometry (VLBI)) that result because each satellite orbits around both the sun and the earth. See; Chubb, *Sun-Induced Variations in Time in the Global Positioning System*, Astrophy. and Space Sc., Vol. 213, pp. 63–74, 1994, which is hereby incorporated in its entirety by reference for all purposes; Wiess, supra; Milliken et al., supra; and Spilker, supra. It is known from VLBI that because each satellite orbits in this fashion, in order to systematically account for changes in frequency occurring between points of reception and transmission, it is necessary to include the gravitationally and orbitally induced red- and blue-shifts in the frequency of GPS transmissions that result from the relative orientation and motion of each GPS satellite about the sun.

SUMMARY OF THE INVENTION

The objective of this invention is to provide an apparatus and method that allows a receiving station utilizing the global positioning system (GPS) satellites to determine its position with an accuracy of 10 cm to one meter.

Another objective is to produce an apparatus for improving estimates of GPS system accuracy for applications in the control segment in the determination of Kalman estimators, based on inputs related to satellite clock bias, frequency offset, and drift rate that incorporate sun-induced effects.

These and other objectives are achieved by a system that determines the systematic errors associated with sun-induced effects that alter the frequency of the transmission of every satellite within the global positioning system (GPS) because of effects that result because the GPS satellites orbit around both the sun and the earth. A correction factor for the systematic errors is determined and applied to the satellite transmission frequency to provide a true position within 10 cm to one meter.

DESCRIPTION OF THE PREFERRED EMBODIMENTS

Figure 1:
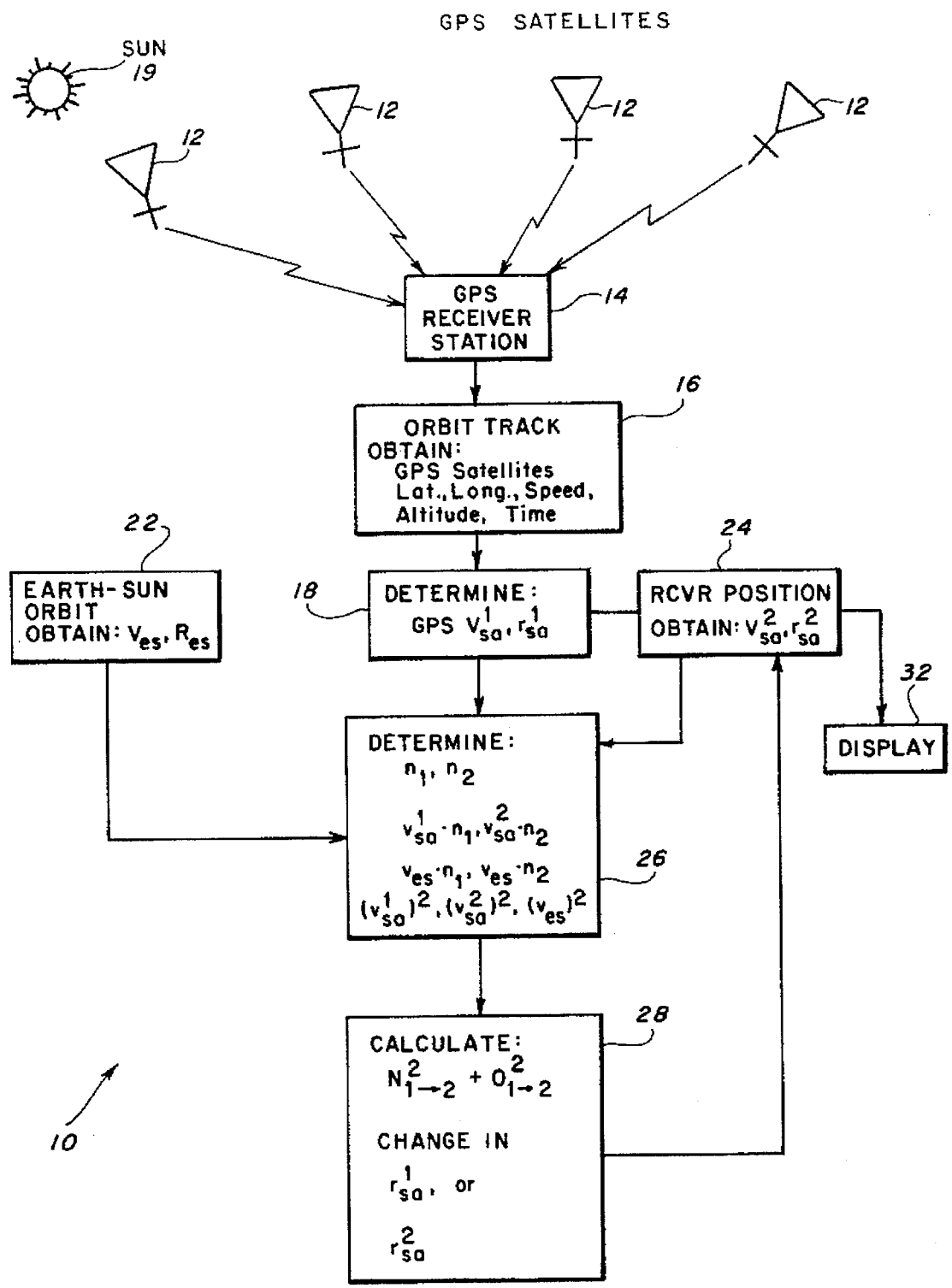
FIG. 1 is a schematic showing the system for determination of location correction by removing the Sun-induced effects in transmissions of the satellites in the global positioning system.

The subject invention is used to determine the systematic errors associated with Sun-induced effects that alter the frequency of the transmission of every satellite within the global positioning system (GPS) or in comparable navigation systems. The basic information utilized in the following formulation is derived from techniques well known to those skilled in the art. See, Kee et al., *Wide Area Differential GPS*, Navigation, Vol 38, No. 2, pp.123–143, 1991; Martin, *GPS User Equipment Error Models*.Navigation, Vol. 25, No. 2, pp. 201–210; Smith et al., *Sensitivity of GPS Acquisition to Initial Data Uncertainties*, Navigation, Vol 31, No. 3, pp. 220–232; Robbins, *Reference Trajectories from GPS Measurements*, Navigation, Vol. 35, No. 1, pp. 89–103, 1988; which are hereby incorporated in their entirety by reference for all purposes; and Milliken, supra.

Table 1 shows the symbology applied in the formulation set forth below.

TABLE 1

| GLOSSARY OF SYMBOLOGY | |
|---|---|
| Symbol | Definition |
| $r_e$ | Radius of the earth ~ 6380 km |
| $r_{sa}$ | Position vector from the center of the earth to the satellite |
| $\hat{r}_{sa}$ | Unit vector pointing between center of the earth and the satellite |
| $r_{es}$ | Separation between the sun and the center of the earth |
| $\hat{r}_{es}$ | Unit vector pointing from the center of the sun to the center of the earth |
| $r_{sas}$ | Position vector from the sun to the satellite |
| $r_{GPS}$ | Distance between the center of the earth and GPS satellite |
| $\Theta^{(i)}$ | Latitude of the reference plane of the ith satellite |
| $\Theta_c$ | Latitude of receiver |
| $\hat{\Theta}_{sa}$ | Unit vector perpendicular to the earth-satellite orbital plane defined so that $\hat{\Theta}_{sa} \times \hat{r}_{sa}$ is pointed in direction of the satellite velocity relative to the center of the earth |
| $\hat{\Theta}_{es}$ | Unit vector perpendicular to sun-earth orbital plane defined such that $\hat{\Theta}_{es} \times \hat{r}_{es}$ is pointed in direction of azimuthal or ordital velocity of earth relative to sun |
| $\Phi_c$ | Longitude of the receiver |
| $\Omega_c$ | Angular frequency= $2\pi$/day of the earth's rotation |
| $\Omega_{sa}$ | for GPS satellite = $2\pi$ radians per half day, for receiving station= $2\pi$/day |
| $\Omega_{es}$ | Angular frequency of the earth-sun orbit =$2\pi$/year |
| $\Omega_{GPS}$ | Angular velocity of the GPS satellite about the earth |
| f | Frequency |
| $f_0$ | Frequency of the microwave signal at the point of transmission |
| $f_1$ | Frequency transmitted from the satellite position |
| $f_2$ | Observed frequency at the receiver |
| v | Speed of the satellite relative to the earth |
| P | Red-shift due to the earth |
| $P_{1\rightarrow 2}^{(e)}$ | Earth-induced gravitational shift |
| $\lambda_{GPS}$ | Longitude of the satellite at its intersection with the equator at the surface of the earth |
| $\alpha$ | Angle between the orbital plane and the plane of the equator |
| $\alpha_d$ | Angle of declination =23/180 in $\pi$ radians of the earth polar radius at the solstice relative to its position at the closest equinox |
| c | Speed of light in m/sec in free space |
| $\beta_{sas}$ | Velocity of the satellite relative to the center of the sun divided by the speed of light |
| $\beta_{sa}^{(i)}$ | Ratio of the velocity of |

TABLE 1-continued
GLOSSARY OF SYMBOLOGY

| Symbol | Definition |
|---|---|
| | the ith satellite to the speed of light |
| $\hat{n}$ | Unit vectors at locations that point along the path of the signal |
| $N_{1 \to 2}^2$ | Sun-induced second order Doppler shifts in frequency that depend upon $\hat{n}$ |
| t | Time in seconds |
| $D_{1 \to 2}^1$ | First order Doppler effect |
| $D_{1 \to 2}^1$ | Second order Doppler effect |
| $M_{1 \to 2}$ | Denominator that must be evaluated in the construction of $N_{1 \to 2}^{(2)}$ |
| $A_{1 \to 2}$ | First of two factors needed to evaluate numerator in construction of $N_{1 \to 2}^{(2)}$ |
| $B_{1 \to 2}$ | Second of two fators needed to evaluate numerator in construction of $N_{1 \to 2}^{(2)}$ |
| $M_e$ | Mass of earth, in Kg |
| $M_s$ | Mass of Sun, in Kg |
| $M_{sa}$ | Mass of satellite, in Kg |
| W | Second order Doppler shift that depends on $\hat{n}$ that is presently included |
| $S_{1 \to 2}^{(2)}$ | Remaining portion of Second order Doppler shift that is presently included |
| $dr_{es}/dt$ | The rate of change of earth-sun separation |
| $O_{1 \to 2}^{(2)}$ | Portion of $D_{1 \to 2}^2$ that does not depend of $\hat{n}$ |
| $\hat{x}$ | Unit vector in the x-direction |
| $\hat{y}$ | Unit vector in y-direction |
| $\hat{z}$ | Unit vector in the z-direction |
| G | Gravitational Constant = 6.67 × $10^{-11}$ $m^{3/(Kg-sec2)}$ |
| $X_u$ | Receiver position matrix |
| $G_u$ | Matrix for constructing geometrical dilution of precision (GDOP) |
| $D_i$ | Initial estimate of the distance of the observer to the ith satellite |
| $E_r$ | Trace of receiver position covariance matrix sun-induced error |
| $\epsilon$ | Adjustable convergence parameter used to determine a new estimate of $D_i$ |
| $D_i^{new}$ | New trial estimate of sun-induced correction in range to ith satellite |

To determine these systematic, errors, the position of each satellite relative to the center of the earth is denoted by $r_{sa}^{(i)} = r_{sa}^{(i)} \hat{r}_{sa}^{(i)}$, (i=1, 24), where $\hat{r}_{sa}^{(i)}$ is a unit vector pointing along the direction of $r_{sa}^{(i)}$ and $r_{sa}^{(i)}$ is its magnitude. Also, relative to the center of the earth, the ratio of the velocity of the ith satellite to c is $\beta_{sa}^{(i)}$, where c is the speed of light. The ith satellite has angular velocity $\Omega_{sa}^{(i)} = \Omega_{sa}^{(i)} \hat{\Theta}_{sa}^{(i)}$ about its earth-centered axis of rotation, which is pointed along the unit vector $\hat{\theta}_{sa}^{(i)}$ and has magnitude $\Omega_{sa}^{(i)}$. Its angular velocity is $\Omega_{es} = \Omega_{es} \hat{\theta}_{es}$; and $\hat{\theta}_{es}$ is pointed along the direction of its orbital axis about the sun (23° towards the equator at the north pole relative to the polar axis). The associated position of the center of the earth is $r_{es} = r_{es} \hat{r}_{es}$ where $r_{es} \sim 9.2 \times 10^7$ miles, and $\hat{r}_{es}$ is a unit vector pointing from the center of the sun to the center of the earth.

In a non-circular orbit, $r_{es}$ varies between $\sim 9.2 \times 10^7$ and $9.3 \times 10^7$ miles. For both the circular and non-circular cases, the position of the ith satellite is $r_{sas}^{(i)} = r_{sa}^{(i)} + r_{es}$. The red-shift expressions for earth-based receivers and transmitters are identified by substituting relevant values for a fictitious satellite moving in the frame of an observer on the earth, defined by $\Omega_{sa}^{(i)} = \Omega_e \hat{\theta}_{sa}^{(i)}$, $\Omega_e = 2\pi/\text{day}$, $\hat{\theta}_{sa}^{(i)} = \hat{z}$, and $r_{sa}^{(i)} = r_e \cos(\theta^{(i)})$, where $r_e \sim 6380$ km is the radius of the earth, and $\theta^{(i)}$ is the latitude of the reference frame. Relative to the center of the sun, the total velocity, v, divided by $c(=\beta_{sas}^{(i)})$ of the (i) transmitter or receiver located at $r_{sas}^{(i)}$ may be approximated using $$\beta_{sas}^{(i)} = \beta_{sa}^{(i)} + \beta_{es} \qquad (1)$$

where $$\beta_{es} = \frac{v_{es}}{c} = \frac{\Omega_{es} \times r_{es}}{c} + \frac{dr_{es}}{cdt} \hat{r}_{es}$$

$$\beta_{sa}^{(i)} = \frac{v_{sa}^{(i)}}{c}$$

Here, $dr_{es}/dt$ is the rate of change of the earth-sun separation. In the most general case, included herein, $dr_{es}/dt \neq 0$. Relative to the center of the sun, the total velocity of the receiver or transmitter divided by $c(=\beta_{sas})$ is $\beta_{sas} = \beta_{es} + \beta_{sa}$ since the relativistic corrections to this expression enter with order $v^3/c^3$, and only terms of order $v^2/c^2$ will be retained. From the equivalency principle, it follows that the observed frequency at the receiver, $f_2$, located at $r_{sas}^{(2)}$, of the signal, $f_1$, that is transmitted from the satellite position, $r_{sas}^{(1)}$, is obtained from a linear order Taylor expansion of the expression $$f_2 = \frac{(1 - \beta_{sas}^{(2)} \cdot \hat{n}_2)\{1 + 2\Phi(r_{sas}^{(1)})/c^2 - (\beta_{sas}^{(1)})^2\}^{1/2} x f_o}{(1 - \beta_{sas}^{(1)} \cdot \hat{n}_1)\{1 + 2\Phi(r_{sas}^{(2)})/c^2 - (\beta_{sas}^{(2)})^2\}^{1/2}} \qquad (2)$$

in terms of its dependence on the gravitational potentials $\phi(r_{sas}^{(1)})$ and $\phi(r_{sas}^{(2)})$. In equation (2), $\hat{n}_2$ and $\hat{n}_1$, respectively, are unit vectors at locations 1 and 2 that point along the path of the signal. In absence of multipath effects (a valid assumption when the receiver is designed in a manner consistent with what is necessary for successful operation; See, Spilker, supra, pg.128) these two vectors may be equated. Also, $f_0$ is the frequency of the microwave signal at the point of transmission. Because $\beta_{sas}^{(i)} \sim 10^{-4}$, it is sufficient to retain terms of order $\beta_{sas}^{(i)2}$ in Equation (2). Then, it follows that the fractional change in frequency $\Delta f/f_0 = (f_2 - f_0)/f_0$ is given by $$\Delta f/f_0 = D_{1 \to 2}^1 + D_{1 \to 2 \; phu \; 1}^1 + P_{1 \to 2} \qquad (3)$$

where $D_{1 \to 2}^1$ and $D_{1 \to 2}^2$ are first order and second order Doppler effects (SDE's) and $P_{1 \to 2}$ is the red-shift.

$$D_{1 \to 2}^1 = [\beta_{sas}^{(1)} \cdot \hat{n}_1 - \beta_{sas}^{(2)} \cdot \hat{n}_2] \qquad (4)$$

and $$D_{1 \to 2} = \frac{1}{2} [(\beta_{sas}^{(2)})^2 - (\beta_{sas}^{(1)})^2] + \beta_{sas}^{(1)} \cdot \hat{n}_1 (\beta_{sas}^{(1)} \cdot \hat{n}_1 - \beta_{sas}^{(2)} \cdot \hat{n}_2) \qquad (5)$$

$$= S_{1 \to 2}^2 + O_{1 \to 2}^2 + N_{1 \to 2}^2$$

where $$S_{1 \to 2}^2 = \frac{1}{2} [(\beta_{sa}^{(2)})^2 - (\beta_{sa}^{(1)})^2] \qquad (6)$$

and $$O_{1 \to 2}^2 = [\beta_{sa}^{(2)} - \beta_{sa}^{(1)}] \cdot \beta_{es} \qquad (7)$$

$$N_{1 \to 2}^2 = \beta_{sas}^{(1)} \cdot \hat{n}_1 (\beta_{sas}^{(1)} \cdot \hat{n}_1 - \beta_{sas}^{(2)} \cdot \hat{n}_2) = \qquad (8)$$

-continued $$[(\beta_{sa}^{(1)} + \beta_{cs}) \cdot \hat{n}_1][\beta_{cs} \cdot (\hat{n}_1 - \hat{n}_2)] +$$

$$(\beta_{cs} \cdot \hat{n}_1)(\beta_{sa}^{(1)} \cdot \hat{n}_1 - \beta_{sa}^{(2)} \cdot \hat{n}_2) + W$$

where $$W = (\beta_{sa}^{(1)} \cdot \hat{n}_1)(\beta_{sa}^{(1)} \cdot \hat{n}_1 - \beta_{sa}^{(2)} \cdot \hat{n}_2) \quad (9)$$

is a portion of the "conventional" SDE contribution $D_{1 \to 2}^2(GPS)(=W+S_{1 \to 2}^2)$ that is already included as a correction to the GPS signal.

Neglecting, (1) the terms of order $r_{21}^{(i)}/r_{es}^3 \sim 10^{-4} r_{es}^{-2}$ (which enter the expression $\Delta f/f_0$ with error $10^{-16}$), and (2) the mass of the earth ($M_e$) and satellite mass relative to the mass of the sun, one finds that $$P_{1 \to 2} = \frac{GM_s}{c^2 r_{es}} \hat{r}_{es} \cdot (r_{sa}^{(1)} - r_{sa}^{(2)}) + P_{1 \to 2}^e. \quad (14)$$

Here, $P_{1 \to 2}^e = -GM_e/c^2[(r_{sa}^{(1)})^{-1} - (r_{sa}^{(2)})^{-1}]$ where P is the red-shift due to the earth.

In earth-fixed coordinates, the direction of the axis of rotation of a receiver or transmitter in the ith GPS satellite is defined by:

(1) the longitude $\lambda_{GPS}^{(i)}$ of its intersection with the equator at the surface of the earth and (2) the angle $\alpha_I \approx 55°$ between its orbital plane and the plane of the equator through the relationship $$\theta_{sa}^{(i)} = \sin(\alpha_1) (\cos(\lambda_{GPS}^{(i)})\hat{x} + \sin(\lambda_{GPS}^{(i)})\hat{y} + \cos(\alpha_1)\hat{z}. \quad (14)$$

This is then applied to the original estimated position of the receiver by obtaining a correction $\delta f_i/f_0$ to the frequency of the transmission of the satellite, from which a range correction $\delta D_i = \delta f_i D_i/f_0$ to the range $d_i$ is obtained, where $D_i$ is the initial estimate of the distance of the observer to the ith satellite. Using this estimate of the correction to $D_i$, a new estimate, $D_i^{new}$, of the range is obtained using $D_i^{new} = D_i + \delta D_i \epsilon$, where $\epsilon$ is an adjustable parameter, such that $0 < \epsilon < 1$. Using this new trial estimate of $D_i^{new}$ of range, a new receiver position is estimated. This new estimate of receiver position is then used in place of the initial uncorrected estimate. Also, using the computed values of $\delta D_i$, the receiver covariance matrix, defined by the equation $cov\delta X_\mu = (G_\mu^T G_\mu) G_\mu^T cov\delta D[(G_\mu^T G_\mu)^{-1} G_\mu^T]$ is constructed where the sun-induced covariance matrix cov6D (associated with the errors from the sun-induced effect) is the 4n×4n matrix defined by the block diagonal form $$cov (\delta D_{ij}) = \delta_i^j \delta_j^{4m} (\delta D^m)^2,$$

m=1, ..., n, where n is the number of satellites used (n=4 is the standard case), $\delta_i^j$=kronecker=0 if $1 \approx j$ and =1 if i=j, and $G_\mu$ and $G_\mu^T$ are defined as in Milliken, supra. The new estimate of position is then used to compute a new estimate of position which is then used to compute a new sun-induced correction. The new correction is then used to estimate a new user covariance matrix $cov\delta X_\mu$. The quantity $E_r = \Sigma_i (cov\delta X_\mu)_{ii}$ provides a measure of the error. When $E_r < 1$ meter, a satisfactory estimate of the correction has been obtained.

Referring to FIG. 1, in the preferred embodiment 10, a plurality of satellites 12, within the electromagnetic view of a receiving station 14, electromagnetically transmit satellite ephemeris information and ionospheric correction information. The receiving station 14, in addition to determining an initial terrestrial location for the receiving station 14 determined from an initial estimate of the frequency of the satellites based upon the uncorrected GPS signal. See, Van Dierendonck et al., *The GPS Navigation Message*, Navigation, Vol. 28, No. 2, pp. 147–165, 1978, which is hereby incorporated in its entirety by reference for all purposes. The received data is further processed by a plurality of electronic circuits or a computer 16, as shown in the U.S. patent application 08/237,568, Gardner, *APPARATUS AND METHOD FOR IONOSPHERIC MAPPING*, which is hereby incorporated in its entirety by reference for all purposes, to obtain the satellites 12 latitude, longitude, speed, altitude. The processed satellite ephemeris data is then further processed by a plurality of electronic circuits or a computer 18, utilizing the source code similar to that shown in Appendix 1, to determine the velocity of the individual satellites 12, $v_{sa}^1$, and the position vector projecting along the line from the center of the earth to the individual satellites 12, $r_{sa}^1$. Also, the velocity of the earth in relation to the sun 19, $v_{es}$, its separation, $R_{es}$, and position, $R_{es} \hat{r}_{es}$, by a plurality of electronic circuits or a computer 22, are determined. The receiving stations 14 velocity with relationship to the satellite 12, $v_{sa}^2$, and position, $r_{sa}^2$, are also computed by a plurality of electronic circuits or a computer 24. Utilizing the outputs of the electronic circuits or computers 18, 22, and 24, a plurality of electronic circuits or a computer 26 determines the unit vectors, $n_1$ and $n_2$, the velocities $v_{es}$, $v_{sa}^1$, and $v_{sa}^2$, the quantities $v_{sa}^1 \cdot n_1$, $v_{sa}^2 \cdot n_2$, $v_{es} \cdot n_1$, $v_{es} \cdot n_2$, $(v_{sa}^1)^2$, $(v_{sa}^1)^2$, and $(v_{es})^2$. The output of the electronic circuits or computer 26 are applied to a plurality of electronic circuits or a computer 28 to calculate the sun-induced second order Doppler shift $N_{1 \to 2}^2 + O_{1 \to 2}^2$, and the change in frequency from which a correction to $r_{sa}^2$ is determined due to the sun-induced error. This correction is then applied to the plurality of electronic circuits or computer 24 where the initial estimate of the frequency obtained at the receiving station 14 to refine the estimate of the terrestrial location of the receiving station 14, thereby, providing position information accurate to within 10 cm to one meter, and which is applied to a display device 32, such as a computer or video display.

Figure 2:
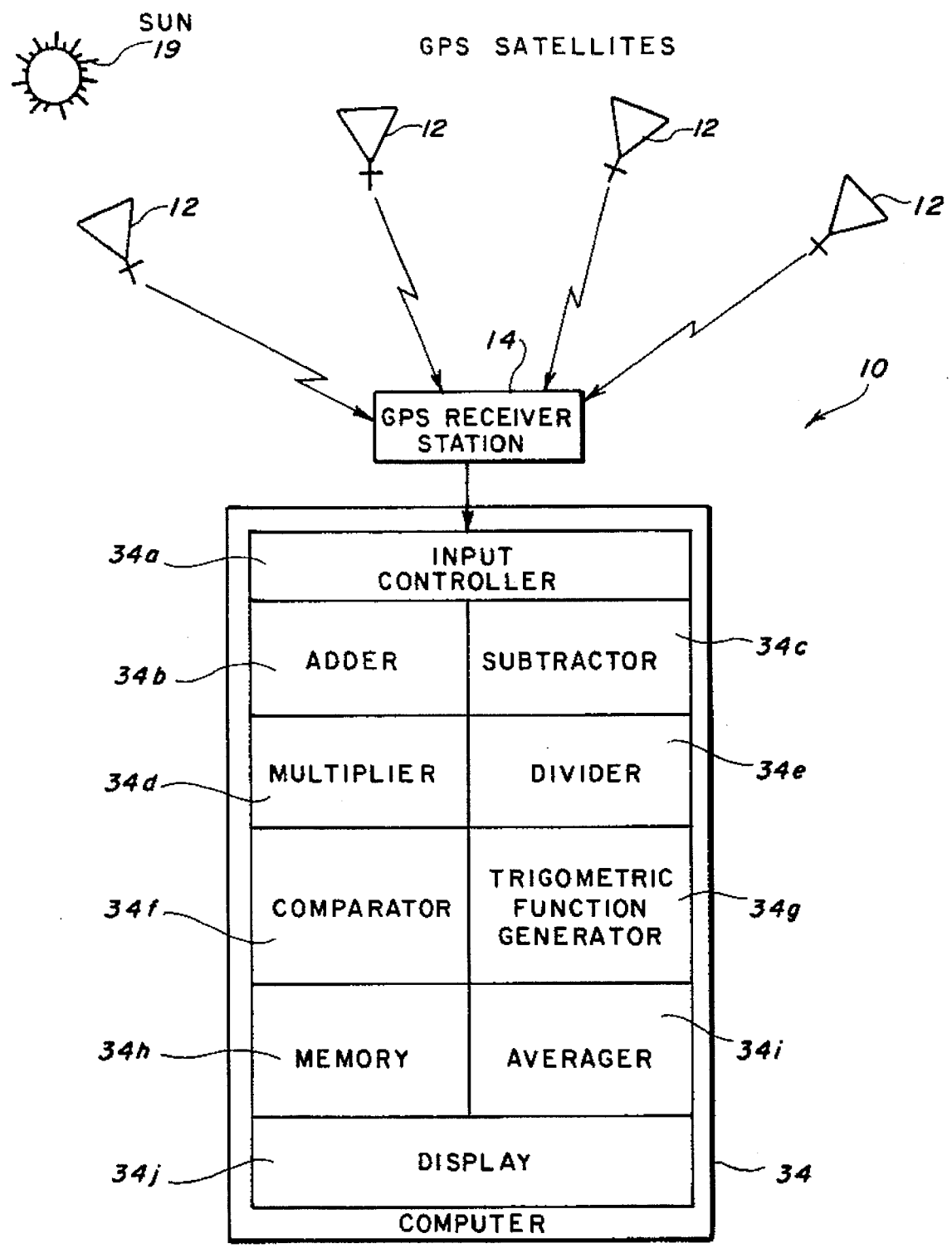
FIG. 2 is a schematic showing the system for determination of location correction by removing sun-induced effects utilizing a computer.
Figure 3:
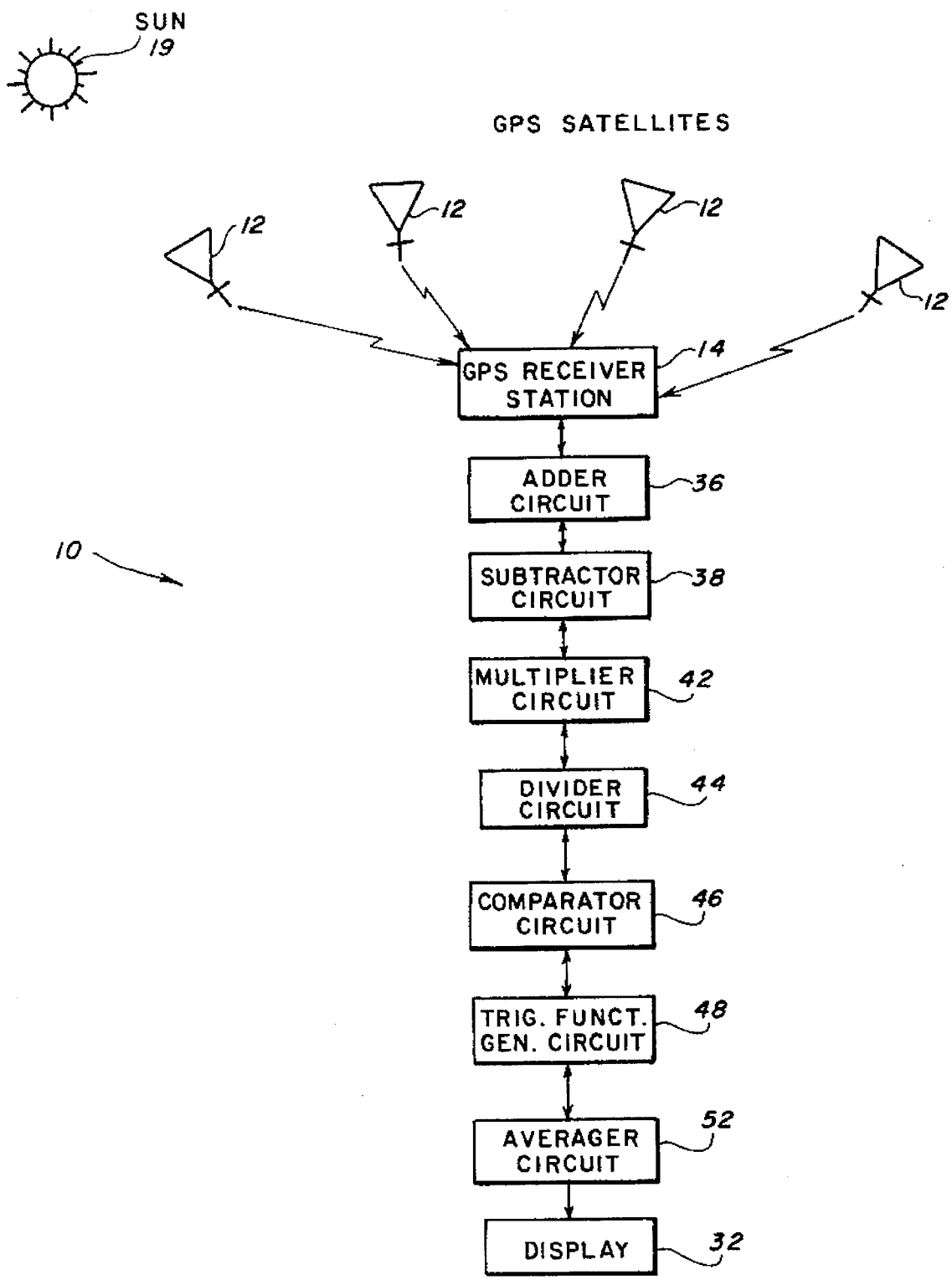
FIG. 3 is a schematic of the system for determination of location correction by removing sun-induced effects utilizing a plurality of electronic circuits.

The operations described above may be accomplished on a computer, such as a Zeos Model PCI486DX4-100, manufactured by Zeos Data Systems Corp. of Minneapolis, Minn. or Mackintosh manufactured by Apple Computer Inc. of Palo Alto, Calif. Any other computer 34 may be utilized, as shown in FIG. 2, providing it has a means for input and control 34a and at least one adder 34b, subtractor 34c, multiplier 34d, divider 34e, comparator 34f, trigometric function generator 34g, memory capability 34h, averager 34i, and a means for displaying data 34j. Further, a plurality of electronic circuits, as shown in FIG. 3, having a capability of adding 36, subtracting 38, multiplying 42, dividing 44, comparing 46, generating trigometric functions 48 and averaging data 52 may be utilized to accomplish the aforementioned operations. The design of the foregoing electronic circuits is well known to those skilled in the art.

The input information required in Kalman estimators of the control segment for satellite position, satellite clock bias, frequency offset and drift rate, and satellite solar pressure constants per satellite may be improved by determining an improved estimate of satellite frequency at each receiving station employed in the control segment based on the incorporation of the change in satellite frequency at each receiving station by using the known position of each receiving station to determine sun-induced correction in the received signal at each receiving station to improve the accuracy of the estimates of the deviation of GPS time relative to the atomic standard time kept at each receiving station, as shown above. From the improved frequency measurements, an alternative estimate of the clock bias, frequency offset and drift for each satellite is obtained at each receiving station. These serve as inputs to the state vector used to determine Kalman estimators of satellite position, satellite velocity, solar pressure constants, and satellite clock bias, frequency, offset, and drift rate. See, Russel et al., *Control Segment and User Performance*, Navigation, Vol. 25, No. 2, pp. 166–172, 1978, which is hereby incorporated in its entirety by reference for all purposes.

The advantage of this invention is the improvement of position location within several feet, meaning that the greatest utility of the invention is in determining absolute position in situations where precise location (at the level of 10 cm to 1 meter) is required, such as approaches by aircraft to small landing areas under periods of extremely limited visibility or for remotely-steered vehicles in confined regions.

It will be understood by those skilled in the art that still other variations and modifications are possible and can be affected without detracting from the scope if this invention as defined in the claims.

APPENDIX 1

```
*****************************************************************
*****************************************************************
*****************************************************************
***Computes Sun Induced Corrections for Four GPS Satellites    ***
***to a Target Satellite                                       ***
***                                                            ***
***The Program also Calculates Covariance Matrix and its       ***
***Spatial Trace using the direction cosine algorithm derived  ***
***by Milliken and Zoller (Navigation, Vol. 25, No. 2, p.105,  ***
***  (1978)                                                    ***
*****************************************************************
*****************************************************************
*****************************************************************
      parameter (npoint=4)
      dimension gfosx(npoint), gfosy (npoint), gfosz(npoint
      dimension gfovx(npoint), gfovy(npoint), gfovz(npoint)
      dimension gpssx(4), gpssv(4), gpssz(4)
      Dimension gpsvx(4), gpsvy(4), gpsvz(4)
      dimension resdot(3), r1(3), r2(3), r2dot(3)
      dimension xnormal(3), work1(3), error(4,3)
      character*1 iyes
      common/pival/twopi
*     open(7,file='gfo_orbit',status='old',form='formatted')
*     open(8,file='gps_orbit',status='old',form='formatted')
3     write(6,*) 'Write Julian Calendar Day'
      read(5,*)xjulian
*********************
*****Convert Julian Day to fraction of a year
      xjulian=xjulian/365
      twopi=8.*atan(1.)
      equinox=80,/365.
      omegaes=(xjulian-equinox)/360.*twopi
      alphad=23.7360.*twopi
      resdot(1)=sin(omegaes)
      resdot(2)=-cos(omegaes)*cos(alphad)
      resdot(3)=cos(omegaes)*sin(alphad)
      irecord=0
      irecord1=0
      irecord1=irecord1+1
      call coordin(gfosx,gfosy,gfosz,gpssz,gpssy,
     *             gpssz,gfovx,gfovy,gfovz,gpsvx,gpsvy,
     *             gpsvz)
      r2(1)=gfosx(1)
      r2(2)=gfosy(1)
      r2(3)=gfosz(1)
      r2dot(1)=gfovz(1)
      r2dot(2)=gfovy(1)
```

```
            r2dot(3)=gfovz(1)
            do 4 i-1,4
            r1(1)=gpssx(i)
            r1(2)=gpssy(i)
            r1(3)=gpssz(i)
            r1dot(1)=gpsvx(i)
            r1dot(2)=gpsvy(i)
            r1dot(3)=gpsvz(i)
            call N2(r1,r1dot,r2,r2dot,resdot,xn2dist,xnormal,dist)
            call s12(r1,r1dot,r2,r2dot,resdot,s12dist,dist)
            coeff=xn2dist+02dist(r1,r1dot,r2,r2dot,resdot)+s12dist
            write(6,*)
          *        ' xn2dist   02dist   s12dist'
            write(6,'(3e11.4)')xn2dist,02dist(r1,r1dot,r2,r2dot,resdot),
          *                   s12dist
            do j=1,3
            error(i,j)=coeff*xnormal(j)
            end do
            write(6,*) 'For GPS satellite located at  :   ',
          *    gpssx(i),',',gpssy(i),',',gpssz(i)
            write(6,*) ' '
 4          write(6,*) ' Error in cm.s is: '
          *    error(i,1),',',error(i,2),',',error(i,3)
         1000 write(6,*) 'Termination after ',irecord-1,' records'
            write(6,*) 'From gfo file'
            write(6,*)  irecord1,' records from gps file have been read'
            stop 'gfo end'
         1001 write(6,*) 'Termination after ',irecord1-1,' records'
            write(6,*) 'From gps file"
            write(6,*)  irecord-1,' records from gfo file have been
          *               read'
            stop 'gps end'
          999 write(6,*) 'Normal end of file'
            write(6,*)  irecord,' records from GFO file'
            write(6,*)  irecord1,' records from GPS file'
            stop 'all done'
            end
            subroutine normal(r1,r2,xnormal,dist)
      ****************************************************************
      ****************************************************************
      ****************************************************************
      ****************************************************************
      *****   Computes normal from point at r1 to r2              ****
      *****   This is the direction of the signal to r2 (note the ****
      *****   deviation in sign from the convention in the paper by ****
      *****   Chubb, Astrophysics and Space Science, Vol.213,      ****
      *****   pp. 63-73, 1994                                      ****
      ****************************************************************
      ****************************************************************
```

```
      dimension r1(3), r2(3), xnormal(3)
      do i=1,3
      xnormal (i)=-r1(i) +r2(i)
      end do
      dist=dot(xnormal,xnormal)
      dist=sqrt(dist)
      do i=1,3
      xnormal(i) =xnormal(i)/dist
      end do
      return
      end
      function dot(a,b)
      dimension a(3),b(3)
      dot=a(1)*b(1)+a(2)*b(2)+a(3)*b(3)
      return
      end
      Function O2dist(r1,r1dot,r2,r2dot,resdot)
****************************************************************
****************************************************************
***** 012dist+Osup2sub1->2 * transit distance (in cm)       ****
*****                     = Osup2sub1->2 multiplied from Eq. ****
*****                       10 multiplied c delta t, where  ****
*****                       delta t = time for light to travel ****
*****                       from gps satellite to target (Eq.10****
*****                       from paper by Chubb)            ****
*****                                                        ****
*****                                                        ****
***** speedc is speed of light in km/sec                    ****
*****                                                        ****
***** betaea is the speed of the surface of the earth       ****
*****                     divided by speedc*                ****
*****                     (which converts distance          ****
*****                     in km to distance in cm           ****
****************************************************************
****************************************************************
****************************************************************
      parameter (speedc=3.e5)
      parameter (betaes=9.9064)
*****speedc is speed of light in km/sec
*****betaes is the speed of the earth about the sun divided by
*****speedc multiplied by 10⁻⁵ (to convert dist, which is
*****measured in km) to cm
      dimension resdot(3), r1(3), r1dot(3) ,r2(3) , r2dot(3)
      dimension xnormal(3),work1(3)
      do i=1,3
      work1(i)=r2dot(i)-r1dot(i)
      end do
```

```
*********Compute instantaneous distance
      do i=1,3
      xnormal (i)=-r1(i)+r2(i)
      end do
      dist=dot(xnormal,xnormal)
      dist=sqrt(dist)
*     write(6,*) 'From O2dist, dist (KM)=',dist
*     write(6,*) '    x          y          z'
*     write(6, '(3e11.4)')work1(1), work1(2),work1(3)
*****and include conversion to centimeters
      O2dist=betaes*dot(resdot,work1)*dist/speedc
      return
      end
      subroutine N2(r1,r1dot,r2,r2dot,resdot,xn2dist,xnormal,
     *                           dist)
      parameter (speedc=3.e5)
      parameter (betaes=9.9064)
***************************************************************
***************************************************************
***** N2  computes N12dist=nsup2sub1->2 (without W)*distance ****
*****                                    (in cm)            ****
*****                        =Nsup2sub1->2 from Eq.11 of Chubb ****
*****                         multiplied c delta t, where delta****
*****                         t = time for light to travel from****
*****                         gps satellite to target        ****
*****                                                        ****
***** speedc is speed of light in km/sec                     ****
*****                                                        ****
***** betaes is the speed of the surface of the earth        ****
*****                    divided by speedc*                  ****
*****                    multiplied by 1.e5                  ****
*****                    (which converts distance            ****
*****                    in km to distance in cm)            ****
***************************************************************
***************************************************************
***************************************************************
      dimension resdot(3),r1(3),r1dot(3),r2(3),r2dot(3)
      dimension xnormal(3),work1(3)
      call normal(r1,r2,xnormal,dist)
      A12=dot(resdot,xnormal)*betaes
      do i=1,3
      work1(i)=r1dot(i)-r2dot(i)
      end do
      b12=dot(work1,xnormal)
      write(6,*) 'From N2, delta(V) dot n1 = ',b12
      write(6,*) 'work1x=',work1(1), ' work1y=',work1(2),
     *            'work1z=',work1(3)
      write(6*) ' velocity sun dot normal/3=',a12
```

```
        xn2dist=a12*b12*dist/speedc
        return
        end
        subroutine s12(r1,r1dot,r2,r2dot,resdot,s12dist,dist)
        parameter (speedc=3.e5)
        parameter (betaes=9.80017)
        parameter (betaea=0.154352)
  ***************************************************************
  ***************************************************************
  ***** S12 computes s12dist=Conventional second order Doppler **
  ***** Correction that compensates for satellite at r2 not being**
  ***** on the surface of the earth.                            **
  ***** S12dist is the dist (in cm) defined by Ssup2sub1->2     **
  ***** multiplied by c delta t (delta t = time for light to    **
  ***** travel from gps satellite to target satellite). Here    **
  ***** Ssup2sub1->2is defined by Eq.9 in Chubb.                **
  *****                                                          **
  ***** speedc is speed of light in km/sec                      **
  ***** betaes is the speed of the surface of the earth         **
  *****                               divided by speedc          **
  ***** multiplied by 1.e5 (which converts distance             **
  *****                     in km to distance in cm)            **
  ***************************************************************
  ***************************************************************
        dimension resdot(3),r1(3),r1dot(3),r2(3),r2dot(3)
        dimension xnormal(3),work1(3)
        b12=dot(r2dot,r2dot)
*       write(6,*) 'from S12, r2dot^2=',b12
        s1to2=-.5*(betaea*betaea-b12/(9.))
        s12dist=s1to2*dist/1.e5
        return
        end
        subroutine coordin(gfosx,gfosy,gfosz,gpssx,gpssy,
     *                     gpssz,gfovx,gfovy,gfovz,gpsvx,gpsvy,
     *                     gpsvz
  ***************************************************************
  ***************************************************************
  ***** Computes velocities and positions, using speed         ****
  ***** height and position information given by Gardner       ****
  *****                                                          ****
  ***** gfosx is the x coordinate of the target                ****
  *****                satellite                                ****
  *****                                                          ****
  ***** gfovx is its x-component velocity                      ****
  *****                                                          ****
  ***** gfosy is the y coordinate of the target                ****
  *****                satellite                                ****
  *****                                                          ****
  ***** gfovy is its y-component velocity                      ****
```

```
      0*****
      ****
      ***** gfosz is the z coordinate of the target         ****
      *****               satellite                         ****
      *****                                                 ****
      ***** gfovz is its z-component velocity               ****
      *****                                                 ****
      ***** gpssx is the x coordinate of the target         ****
      *****               satellite                         ****
      *****                                                 ****
      ***** gpsvx is its x-component velocity               ****
      *****                                                 ****
      ***** gpssy is the y coordinate of the target         ****
      *****               satellite                         ****
      *****                                                 ****
      ***** gpsvy is its y-component velocity               ****
      *****                                                 ****
      ***** gpssz is the z coordinate of the target         ****
      *****               satellite                         ****
      *****                                                 ****
      ***** gpsvz is the z-component velocity               ****
      *****                                                 ****
      ***** All x-coordinates are defined by the line parallel ****
      ***** to line between 0 degrees N, 0 degrees W        ****
      ***** and the earth's center;                         ****
      *****                                                 ****
      ***** all z-coordinates are parallel to the           ****
      ***** line between the earth's center and the north   ****
      ***** pole;                                           ****
      *****                                                 ****
      ***** the y-coordinates point along the line between  ****
      ***** the earth center and -90 degree W longitude,    ****
      ***** 0 degrees N latitude.                           ****
      *****                                                 ****
      ****************************************************************
      **************************************************************** parameter (npoint=4)
          parameter (rearth=6367.5)
          dimension gfosx(npoint),gfosv(npoint),gfosz(npoint)
          dimension gfovx(npoint),gfovy(npoint),gfovz(npoint)
          dimension gpssx(4),gpssy(4),gpssz(4)
          dimension gpsvx(4),gpsvy(4),gpsvz(4)
          dimension gpsvel(3),gfovel(3)
          dimension work1(3),work2(3),work3(3)
          dimension word1(3),word2(3),word3(3)
          dimension r1(3)
     *    dimension geolat(3),geolong(3)
     *    dimension gpslat(3),gpsLong(3)
```

```
            dimension g(3)
   00       character*80 filename
            common/pival/twopi
            do 1 ifile=1,4
            filename='85.093alx'
            do irecord=1,3
            call sat_dat(irecord,filename,xnor,xwes,velo,geohi,
           *                gpnor,gpwes,gpvelo,gphi)
            write(6,*) 'geosat height=',geohi
            write(6,*) 'geosat north latitude=',xnor
            write(6,*) 'geosat west longitude=',xwes
            write(6,*) 'geosat velocity=',velo
            write(6,*) 'gps height=',gphi
            write(6,*) 'gps north latitude=',gpnor
            write(6,*) 'gps west longitude=',gpwes
            write(6,*) 'gps velocity=',gpvelo
            i=ifile
            gpslat=gpnor*twopi/360.
            gpslong=gpwes*twopi/360.
            geolat=xnor*twopi/360.
            geolong=xwes*twopi/360.
            if(irecord.eq.2)then
            gpssx(i)=cos(gpslat)*cos(gpslong)*(rearth+gphi)
            gpssy(i)=cos(gpslat)*sin(gpslong)*(rearth+gphi)
            gpssz(i)=sin(gpslat)*(rearth+gphi)
            gfosx(i)=cos(geolat)*cos(geolong)*(rearth+geohi)
            gfosy(i)=cos(geolat)*sin(geolong)*(rearth+geohi)
            gfosz(i)=sin(geolat)*(rearth+geohi)
            endif
            work1(irecord)=cos(gpslat)*cos(gpslong)
            work2(irecord)=cos(gpslat)*sin(gpslong)
            work3(irecord)=sin(gpslat)
            word1(irecord)=cos(geolat)*cos(geolong)
            word2(irecord)=cos(geolat)*sin(geolong)
            word3(irecord)=sin(geolat)
            gpsvel(irecord)=gpvelo
            gfovel(irecord)=velo
            end do
   *********Find Tangent vector at r2, compute V using this
            g(1)=work1(1)
            g(2)=work1(2)
            g(3)=work1(3)
            x1=0.
            x2-1.
            x3=2.
            call three(g,x1,x2,x3,a,b,c,value,deriv)
            r1(1)=deriv
            g(1)=work2(1)
            g(2)=work2(2)
```

```
        g(3)=work2(3)
 0      x1=0.
        x2=1.
        x3=2.
        call three(g,x1,x2,x3,a,b,c,value,deriv)
        r1(2)=deriv
        g(1)=work3(1)
        g(2)=work3(2)
        g(3)=work3(3)
        x1=0.
        x2-1.
        x3=2.
        call three(g,x1,x2,x3,a,b,c,value,deriv)
        r1(3)=deriv
        dist=dot(r1,r1)
        dist=sqrt(dist)
***********computes same velocities when same file is used*
        gpsvx(i)=r1(1)/dist*gpsvel(i)
        gpsvy(i)=r1(2)/dist*gpsvel(i)
        gpsvz(i)=r1(3)/dist*gpsvel(i)
***********computes same velocities when same file is used*
        g(1)=word1(1)
        g(2)=word1(2)
        g(3)=word1(3)
        x1=0.
        x2=1.
        x3=2.
        call three(g,x1,x2,x3,a,b,c,value,deriv)
        r1(1)=deriv
        g(1)=word2(1)
        g(2)=word2(2)
        g(3)=word2(3)
        x1=0.
        x2=1.
        x3=2.
        call three(g,x1,x2,x3,a,b,c,value,deriv)
        r1(2)=deriv
        g(1)=word3(1)
        g(2)=word3(2)
        g(3)=word3(3)
        x1=0.
        x2=1.
        x3=2.
        call three(g,x1,x2,x3,a,b,c,value,deriv)
        r1(3)=deriv
        dist=dot(r1,r1)
        dist=sqrt(dist)
        gfovx(i)=r1(1)/dist*gfovel(i)
        gfovy(i)=r1(2)/dist*gfovel(i)
```

```
        gfovz(i)=r1(3)/dist*gfovel(i)
      0 if(i.eq.1)then
        write(6,*)'   gpssx   ,   gpssy   ,   gpssz      (unit vecs)'
        write(6,'(3e11.4)')work1(1),work2(1),work3(1)
        write(6,'(3e11.4)')work1(2),work2(2),work3(2)
        write(6,'(3e11.4)')work1(3),work2(3),work3(3)
        write(6,'(/,a1)')' '
        write(6,*)'   gfosx   ,   gfosy   ,   gfosz      (unit vecs)'
        write(6,'(3e11.4)')word1(1),word2(1),word3(1)
        write(6,'(3e11.4)')word1(2),word2(2),word3(2)
        write(6,'(3e11.4)')word1(3),word2(3),word3(3)
        write(6,'(/,a1)')' '
        write(6,*)'   gpsvx   ,   gpsvy   ,   gpsvz      (unit vec)'
        write(6,'(3e11.4)')gpsvx(i),gpsvy(i),gpsvz(i)
        write(6,*) '   gfovx   ,   gfovy   ,   gfovz        '
        write(6,'(3e11.4)')gfovx(i),gfovy(i),gfovz(i)
        endif
      1 continue
        return
        end
        subroutine three(g,x1,x2,x3,a,b,c,value,deriv)
  ***************************************************************
  ***************************************************************
  *****  Simple three point polynomial fit routine; computes *****
  *****  value of the derivative of the three point vector g *****
  *****  (defined at points x1, x2, and x3) at the point x2. *****
  *****  This routine is used to determine direction of gps  *****
  *****  and target satellites.                              *****
  ***************************************************************
  ***************************************************************
        dimension g(3)
        write(6,*)'g=',g
        f12=g(1)-g(2)
        f32=g(3)-g(2)
        f13=g(1)-g(3)
        x12=x1-x2
        x13=x1-x3
        x32=x3-x2
        den12=x12*x13
        den32=-x32*x13
      *  write(6,*)'den12=',den12,' den32=',den32
        a=f12/den12+f32/den32
        b=f12/x12-a*(x1+x2)
        c=g(2)-a*x2*x2-b*x2
        value=a*x2*x2+b*x2+c
        deriv=a*2*x2+b
        write(6,*) 'deriv= ',deriv, ' value=',value
        return
        end
```

```
          subroutine sat_dat(irecord,filename,xnor,xwes,velo,geohi,
         *              gpnor,gpwes,gpvelo,gphi)
    ***************************************************************
    ***************************************************************
    ***************************************************************
    *****                                                     *****
    *****                                                     *****
    *****                                                     *****
    ***** Reads positions of satellites from Gardner          *****
    *****                                                     *****
    *****         variables:                                  *****
    *****                                                     *****
    *****         xnor -is north latitude of target satellite *****
    *****                                                     *****
    *****         xwes -is its west latitude-                 *****
    *****                                                     *****
    *****                 (both relative to Greenwich.)       *****
    *****                                                     *****
    *****         velo -is the target satellite speed         *****
    *****                                                     *****
    *****         gphi -is the gps satellite altitude         *****
    *****                                                     *****
    *****         gpnor -is the gps satellite north latitude  *****
    *****                                                     *****
    *****         gpwes -is the gps satellite west latitude   *****
    *****                                                     *****
    *****         gpvelo -is the gps satellite speed.         *****
    ***************************************************************
    ***************************************************************
          character*150 reader
          character*80 filename
          open(2,file='gpsgeosat.dat',form='formatted')
          open(1,file=filename,form='formatted')
          i=0
          i=i+1
          read(1,'(a)',end=1000)reader
          if(i.eq.19+irecord)then
          write(2,* )'record ',i
          write(2,* )reader
          i1=32
          i2=36
          read(reader(i1:i2),'(i5)')idust
          idistan=idust
          i1=43
          i2=48
          read(reader(i1:i2),'(f6.2)'dust
          geohi=dust
          i1=51
          i2=55
```

```
            read(reader(i1:i2),'(f6.2)')dust
            xnor=dust
            i1=58
            i2=63
            read(reader(i1:i2),'(f6.2)')dust
            xwes=dust
            i1=68
            i2=71
            read(reader(i1:i2),'(f6.2)')dust
            velo=dust
            i1=84
            i2=91
            read(reader(i1:i2),'(f7.1)')dust
            gphi=dust
            i1=93
            i2=97
            read(reader(i1:i2),'(f6.2)')dust
            gpnor=dust
            i1=100
            i2=105
            read(reader(i1:i2),'(f6.2)')dust
            gpwes=dust
            i1=110
            i2=113
            read(reader(i1:i2),'(f6.2)')dust
            gpvelo=dust
            write(2,* ) 'distance=',idistan
            write(2,* ) 'geosat height=',geohi
            write(2,* ) 'geosatnorth latitude=',xnor
            write(2,* ) 'geosat west longitude=',xwes
            write(2,* ) 'geosat velocity=',velo
            write(2,* ) 'gps height=',gphi
            write(2,* ) 'gps north latitude=',gpnor
            write(2,* ) 'gps west longitude=',gpwes
            write(2,* ) 'gps velocity=',gpvelo
            go to 1000
            endif
            go to 1
       1000 write(2,* ) ' record number', i , 'corresponding to'
            write(2,* ) ' satellite:',reader(1:22),' Has been read'
            close(1)
            close(2)
            return
            end
            subroutine gdop( gfosx,gfosy,gfosz,gpssx,gpssy,gpssz,
                             error, gd)
       ****************************************************************
       ****************************************************************
       ****************************************************************
```

```
      ***** Calculations Covariance Matrix and its spatial trace *****
      ***** Using the Direction cosine algorithm derived by         *****
      ***** Milliken and Zoller (Navigation, Vol. 25, No. 2, p.105*****
      ***** (1978).                                                 *****
      *****                                                         *****
      ***** error is a three vector defined by the error from       *****
      ***** sun-induced correction multiplied by a unit vector      *****
      ***** gd is sum of the diagonal (sigxx, sigyy, sigzz)         *****
      ***** elements of the covariance matrix. This corresponds     *****
      ***** to the error in height.  4 independent GPS              *****
      ***** satellites are assumed.  Their positions are stored     *****
      ***** in gpssx,gpssy, and gpssz.  Similarly, the position     *****
      ***** of the satellite that uses the gps are                  *****
      ***** stored in gfosx, gfosy, and gfosz.                      *****
      ****************************************************************
      ****************************************************************
      parameter(npoint=4)
      dimension gfosx(npoint),gfosy(npoint),gfosz(npoint)
      dimension gpssx(4),gpssy(4),gpssz(4)
      dimension resdot(3),r1(3),ridot(3),r2(3),r2dot(3)
      dimension xnormal(3),work1(3),G(4,4),error(4,3)
      dimension cov(3),eig(4),gtrans(4,4),summer(4,3)
      dimension covar(4,4),gtrgi(4,4),xmulti(4,4),xmulti1(4,4)
      dimension xmulti2(4,4)
      do i=1,4
      do j=i,3
      cov(j)=error(i,j)
      summer(i,j)=0.
      end do
      eig(i)-sqrt(dot(cov,cov))
      end do
      do ii=i,4
      do jj=1,4
      covar(ii,jj)=eig(ii)*eig(jj)
      end do
      end do
      r1(1)=gfosx(1)
      r1(2)=gfosy(1)
      r1(3)=gfosz(1)
      do 1 ii=1,4
      r2(1)=gpssx(ii)
      r2(2)=gpssy(ii)
      r2(3)=gpssz(ii)
      call normal (r1,r2,xnormal,dist)
      do jj=1,3
      qtrans(jj,ii)=xnormal(jj)
      G(ii,jj)=xnormal(jj)
      end do
      qtrans(4,ii)=1
```

```
      1 G(ii,4)=1
        call invert(G,GTRGI,4,4)
        gd=0
        call matmult(xmulti,gtrgi,gtrans)
        call trans(xmulti1,xmulti)
        call matmult(xmulti2,xmulti,covar)
        call matmult(xmulti,xmulti2,xmulti1)
        gd=0.
        do 2 kk=1,3
      2 gd=gd+xmulti(kk,kk)
        return
        end
        Subroutine matmult(xmulti,gtrgi,gtrans)
        dimension xmulti(4,4),gtrgi(4,4),gtrans(4,4)
        do 1 ii=1,4
        do 1 jj=1,4
      1 xmulti(ii,jj)=0.
        do 3 kk=1,4
        do 3 ll=1,4
        do 2 ii=1,4
      2 xmulti(kk,ll)=xmulti(kk,ll)+gtrgi(kk,ii)*gtrans(ii,ll)
      3 continue
        return
        end
        subroutine trans(xmulti1,xmulti)
        dimension xmulti(4,4)
        dimension xmulti1(4,4)
        do 1 kk=1,4
        do 1 ll=1,4
      1 xmulti1(ll,kk)=xmulti(kk,ll)
        return
        end
C ###############################################################
C
        subroutine invert(g,gtginv,ni,nj)
C
        dimension g(ni,nj),gtginv(nj,nj),x(150)
C
C >>> This returns the inverse of the matrix product
C   >>> transpose(g)*g for arbitrarily sized g.
C
C >>> The array x is dimensioned but unused by this routine.
C
        do i=1,nj
          do j=1,nj
            gtginv(i,j)=0.0
C
C >>> Note: this is just matrix multiplication with one set of
C >>>           indices switched to form the transpose.
```

```
      c
              do k=1,ni
                gtginv(i,j)=gtginv(i,j)+g(k,i)*g(k,j)
              enddo
      c
            enddo
          enddo
      c
      c >>> Setup variables to invert gtginv in place and test the
      c >>> validity of the returned inverse by the determinate value.
      c >>>
      c >>>     eps    determines whether the matrix is singular
      c >>>            and sets a lower limit on the determinant.
      c >>>
      c >>>     indic  set to -1 means invert a square matrix.
      c
            eps = 1.e-6
            indic = -1
      c
            if(abs(simul (nj,gtginv,x,eps,indic,nj)).lt.eps) then
               write(*,*) ' The matrix transpose(g)  * g is singular.  '
               write(*,*) ' Recheck the independence of GPS input.  '
               stop
            endif
      c
            return
            end
      c
      c ###############################################################
      c
            FUNCTION SIML(N,a,X,EPS,INDIC,NRC)
      c
      c     TAKEN FROM APPLIED NUM. METHODS, P. 290-291
      c
      c     WHEN INDIC IS NEGATIVE, SIMUL COMPUTES THE INVERSE OF THE N
      c     BY N MATRIX A IN PLACE.  WHEN INDIC IS ZERO, SIMUL COMPUTES
      c     THE N SOLUTIONS X(1) ...X(N) CORRESPONDING TO THE SET OF
      c     LINEAR EQUATIONS WITH AUGMENTED MATRIX OF COEFFICIENTS IN
      c     THE N BY N+1 ARRAY A AND IN ADDITION COMPUTES THE INVERSE OF
      c     THE COEFFICIENT MATRIX IN PLACE AS ABOVE.  IF INDIC IS
      c     POSITIVE, THE SET OF LINEAR EQUATIONS IS SOLVED BUT THE
      c     INVERSE IS NOT COMPUTED.  THE GAUSS-JORDAN COMPLETE
      c     ELIMINATION METHOD IS EMPLOYED WITH THE MAXIMUM PIVOT
      c     STRATEGY.  ROW AND COLUMN SUBSCRIPTS OF SUCCESSIVE PIVOT
      c     ELEMENTS ARE SAVED IN ORDER IN THE IROW AND JCOL ARRAYS
      c     RESPECTIVELY.  K IS THE PIVOT COUNTER, PIVOT THE ALGEBRAIC
      c     VALUE OF THE PIVOT ELEMENT, MAX THE NUMBER OF COLUMNS IN A
      c     AND DETER THE DETERMINANT OF THE COEFFICIENT MATRIX.  THE
      c     SOLUTIONS ARE COMPUTED IN THE (N+1)THE COLUMN OF A AND THEN
```

```
C     UNSCRAMBLED AND PUT IN PROPER ORDER IN X(1)...X(N) USING THE
C     PIVOT SUBSCRIPT INFORMATION AVAILABLE IN THE IROW AND JCOL
C     ARRAYS. THE SIGN OF THE DETERMINANT IS ADJUSTED, IF
C     NECESSARY, BY DETERMINING IF AN EVEN OR ODD NUMBER OF
C     PAIRWISE INTERCHANGES IS REQUIRED TO PUT THE ELEMENTS OF THE
C     JORD ARRAY IN ASCENDING SEQUENCE WHERE JORD(IROW(I) =
C     JCOL(I). IF THE INVERSE IS REQUIRED,IT IS UNSCRAMBLED IN
C     PLACE USING Y(1)...Y(N) AS TEMPORARY STORAGE. THE VALUE OF
C     THE DETERMINANT IS RETURNED AS THE VALUE OF THE FUNCTION.
C     SHOULD THE POTENTIAL PIVOT OF THE LARGEST MAGNITUDE BE
C     SMALLER IN MAGNITUDE THAN EPS, THE MATRIX IS CONSIDERED TO
C     BE SINGULAR AND A TRUE ZERO IS RETURNED AS THE VALUE OF THE
C     FUNCTION.
C
      IMPLICIT REAL*8(A-H,O-Z)
      REAL*4 A,X,EPS,SIMUL
      DIMENSION IROW(150),JCOL(150),JORD(150),Y(150),A(N,NRC),X(N)
C
      MAX=N
      IF(INDIC.GE.O) MAX=N+1
C
C     .....IS N LARGER THAN 150 .....
      IF(N.LE.150) GO TO 5
      WRITE(6,'(''N TOO BIG'')')
      SIMUL=0
      RETURN
C
C     ..... BEGIN ELIMINATION PROCEDURE.....
    5 DETER=1
      DO 18 K=1,N
      KM1=K-1
C
C     ..... SEARCH FOR PIVOT ELEMENT .....
      PIVOT=0.0
      DO 11 I=1,N
      DO 11 J=1,N
C
C     ..... SCAN IROW AND JCOL ARRAYS FOR INVALID PIVOT
C           SUBSCRIPTS.....
      IF(K.EQ.1) GO TO 9
      DO 8 ISCAN=1,KM1
      IF(I.EQ.IROW(ISCAN)) GO TO 11
      IF(J.EQ.JCOLiISCAN)) GO TO 11
    8 CONTINUE
    9 IF(ABS(A(I,J)).LE.ABS(PIVOT) GO TO 11
      PIVOT=Q(I,J)
      IROW(K)=I
      JCOL(K)=J
   11 CONTINUE
```

```
C
C       ..... INSURE THAT SELECTED PIVOT IS LARGER THAN EPS .....
        IF (ABS(PIVOT).GT.EPS) GO TO 13
        SIMUL=0
        RETURN
C
C       .....UPDATE THE DETERMINANT VALUE .....
     13 IROWK=IROW(K)
        JCOLK=JCOL(K)
        DETER=DETER*PIVOT
C
C       ..... NORMALIZE PIVOT ROW ELEMENTS .....
        DO 14 J=1,MAX
     14 A(IROWK,J)=A(IROW,J)/PIVOT
C
C       .....CARRY OUT ELIMINATION AND DEVELOP INVERSE .....
        A(IROWK,JCOLK)-1./PIVOT
        DO 18 I=1,N
        AIJCK=A(I,JCOLK)
        IF(I.EQ.IROWK) GO TO 18
        A(I,JCOLK=-AIJCK/PIVOT
        DO 17 J=1,MAX
     17 IF(J.NE.JCOLK) A(I,J)=A(I,J)-AIJCK*A(IROWK,J)
     18 CONTINUE
C
C       .....ORDER SOLUTION VALUES (IF ANY) AND CREATE JORD
C             ARRAY.....'
        DO 20 I=1,N
        IROWI=IROW(I)
        JCOLI=JCOL(I)
        JORD(IROWI)=JCOLI
     20 IF(INDIC.GE.0) X(JCOLI)=A(IROWI,MAX)
C
C       ..... ADJUST SIGN OF DETERMINANT .....
        INTCH=0
        NM=N-1
        DO 22 I=1,NM1
        IP1=I+1
        DO 22 J=IP1,N
        IF (JORD(J) .GE.JORD(I)) GO TO 22
        JTEMP=JORD(J)
        JORD(J)=JORD(I)
        JORD(I)=JTEMP
        INTCH=INTCH+1
     22 CONTINUE
        IF(INTCH/2*2.NE.INTCH) DETER=-DETER
C
C       .....IF INDIC POSITIVE RETURN WITH RESULTS .....
        IF (INDIC.LE.0) GO TO 26
```

```
          SIMUL=DETER
          RETURN
    C
    C     ..... IF INDIC IS POSITIVE OR ZERO, UNSCRAMBLE THE INVERSE
    C             FIRST BY ROWS .....
       26 DO 28 J=1,N
          DO 27 I=1,N
          IROWI=IROW(I)
          JCOLI=JCOL(I)
       27 Y(JCOLI)=A(IROWI,J)
          DO 28 I=1,N
       28 A(I,J)=Y(I)
    C     ..... THEN BY COLUMNS .....
          DO 30 I=1,N
          DO 29 J=1,N
          IROWJ=IROW(J)
          JCOLJ=JCOL(J)
       29 Y(IROWJ)=A(I,JCOLJ)
          DO 30 J=1,N
       30 A(I,J)=Y(J)
    C
    C     ..... RETURN FOR INDIC NEGATIVE OR ZERO .....
          SIMUL=DETER
    C
          RETURN
          END
    C
```

What is claimed is:

1. A device for determining the position of a global positioning system (GPS) receiving station comprised of:

a plurality GPS satellites, each satellite transmitting a plurality of electromagnetic signals containing the satellite ephemeris data and ionospheric correction information;

a receiver for receiving the plurality of electromagnetic signals of a first plurality of standard GPS satellite frequencies from the plurality of GPS satellites;

means for determining a first terrestrial position of the receiver from the GPS satellites ephemeris data and ionospheric correction information based on the plurality of standard GPS frequencies and reading and deciphering both the C/A and P codes;

means for determining a velocity and position of the earth in relation to the sun and a rotational velocity of the receiver about the center of the earth at the position of the receiver;

means for determining a position and velocity of each GPS satellite relative to the center of the earth from the ephemeris data;

means for calculating a non-path-dependent second order Doppler frequency shift contribution ($O_{1 \rightarrow 2}^2$) and path-dependent second order Doppler frequency shift contribution ($N_{1 \rightarrow 2}^2$) in the transmission from each satellite and the change in frequency of transmission of the satellites from the plurality of standard GPS satellite frequencies resulting from sun-induced effects;

means for applying the calculated change in frequency of each GPS satellite to the first standard GPS frequency received by the receiving station to correct the first terrestrial position of the receiver; and means for displaying the corrected position of the receiving station.

2. A device, as shown in claim 1, wherein the means for determining a first terrestrial position of the receiver from the GPS satellites ephemeris data and ionospheric correction information based on the plurality of standard GPS frequencies; means for determining a velocity and position of the earth in relation to the sun and a rotational velocity of the receiver about the center of the earth at the position of the receiver; means for determining a position and velocity of each GPS satellite relative to the center of the earth from the ephemeris data; means for calculating a non-path-dependent second order Doppler frequency shift contribution ($N_{1 \rightarrow 2}^2$) and path-dependent second order Doppler frequency shift contribution ($O_{1 \rightarrow 2}^2$) in the transmission from each satellite and the change in frequency of transmission of the satellites from the standard GPS satellite frequency resulting from sun-induced effects; means for applying the calculated change in frequency of each GPS satellite to the first standard GPS frequency received by the receiving station to correct the first terrestrial position of the receiver; and means for displaying the corrected position of the receiving station is a computer.

3. A device, as shown in claim 1, wherein the means for determining a first terrestrial position of the receiver from the GPS satellites ephemeris data and ionospheric correction information based on the plurality of standard GPS frequencies; means for determining a velocity and position of the earth in relation to the sun and a rotational velocity of the receiver about the center of the earth at the position of the receiver; means for determining a position and velocity of each GPS satellite relative to the center of the earth from the ephemeris data; means for calculating a non-path-dependent second order Doppler frequency shift contribution ($N_{1 \rightarrow 2}^2$) and path-dependent second order Doppler frequency shift contribution ($O_{1 \rightarrow 2}^2$) in the transmission from each satellite and the change in frequency of transmission of the satellites from the standard GPS satellite frequency resulting from sun-induced effects; and means for applying the calculated change in frequency of each GPS satellite to the first standard GPS frequency received by the receiving station to correct the first terrestrial position of the receiver are a plurality of electronic circuits.

4. A device, as shown in claim 1, wherein the means for determining a first terrestrial position is a plurality of electronic circuits.

5. A device, as shown in claim 1, wherein the means for determining a first terrestrial position is a computer.

6. A device, as shown in claim 1, wherein the means for determining a velocity and position of the earth in relation to the sun and a rotational velocity of the receiver about the center of the earth at the position of the receiver is a plurality of electronic circuits.

7. A device, as shown in claim 1, wherein the means for determining a velocity and position of the earth in relation to the sun and a rotational velocity of the receiver about the center of the earth at the position of the receiver is a computer.

8. A device, as shown in claim 1, wherein the means for determining a position and velocity of each GPS satellite relative to the center of the earth is a plurality of electronic circuits.

9. A device, as shown in claim 1, wherein the means for determining a position and velocity of each GPS satellite relative to the center of the earth is a computer.

10. A device, as shown in claim 1, wherein the means for calculating a non-path-dependent and path-dependent second order Doppler frequency shift contribution in the transmission of each satellite and the change in frequency of transmission of the satellites from the standard frequency that results from sun-induced effects is a plurality of electronic circuits.

11. A device, as shown in claim 1, wherein the means for calculating a non-path-dependent and path-dependent second order Doppler frequency shift contribution in the transmission of each satellite and the change in frequency of transmission of the satellites from the standard frequency that results from sun-induced effects is a computer.

12. A device, as shown in claim 1, wherein the means for applying a resulting change in frequency of each GPS satellite to the first standard GPS frequency received by the receiving station is a plurality of electronic circuits.

13. A device, as shown in claim 1, wherein the means for applying a resulting change in frequency of each GPS satellite to the first standard GPS frequency received by the receiving station is a computer.

14. A device, as shown in claim 1, wherein the means for displaying the corrected position of the receiving station is a computer.

15. A device, as shown in claim 1, wherein the means for displaying the corrected position of the receiving station is a video display.

16. A method for improving the determined position of a receiver utilizing global positioning system (GPS) satellites comprising the steps of:

determining a first terrestrial position of the receiver from the GPS satellites ephemeris data and ionospheric correction information based on a standard GPS frequency;

determining a velocity and position of the earth in relation to the sun and a rotational velocity of the receiver about the center of the earth at the position of the receiver;

determining a position and velocity of each GPS satellite relative to the center of the earth from the ephemeris data;

calculating a second order Doppler frequency shift contribution in the transmission from each satellite and the change in frequency of transmission of the satellites from the standard GPS satellite frequency resulting from sun-induced effects;

applying the calculated change in frequency of each GPS satellite to the first standard GPS frequency received by the receiving station to correct the first terrestrial position of the receiver; and displaying the corrected position of the receiving station.

17. A method for improving the determination of Kalman estimators of control segment for global positioning system (GPS) satellite position, satellite clock bias, frequency offset and drift rate, and satellite solar pressure constants for each GPS satellite comprising the steps of:

determining a first estimate of a first GPS satellite frequency at each receiving station employed in the control segment, based on a change in satellite frequency at each receiving station utilizing a known position of each receiving station to determine a sun-induced correction in a received signal to improve accuracy of a deviation of GPS time relative to an atomic standard time at each receiving station;

determining a second estimate of the clock bias, frequency offset and drift for each GPS satellite at each receiving station to obtain a second frequency measurement; and inputting the second estimate from the second frequency measurement of clock bias, frequency offset and drift to determine Kalman estimators of GPS satellite position, satellite velocity, solar pressure constants, and the satellite clock bias, frequency, offset, and drift rate.

* * * * *